United States Patent [19]
Studddard

[11] 3,760,473
[45] Sept. 25, 1973

[54] PLIERS WITH CUTTING SURFACES

[76] Inventor: James T. Studdard, 232 Dorris Dr., Marietta, Ga. 30060

[22] Filed: Nov. 5, 1971

[21] Appl. No.: 195,938

[52] U.S. Cl.................. 29/78, 7/3 R, 15/104.04
[51] Int. Cl............................................ B23d 71/00
[58] Field of Search.................... 7/1 E, 5.1, 5.4, 7/3 R, 4; 15/104.02, 104.03, 104.04, 236 R, 104.01 R; 29/78

[56] References Cited
UNITED STATES PATENTS

| | | | |
|---|---|---|---|
| 1,902,913 | 3/1933 | Sievern | 7/5.1 |
| 1,560,441 | 11/1925 | Trosper | 15/104.02 |
| 2,551,875 | 5/1951 | Cotton | 15/236 |
| 2,922,218 | 1/1960 | Lewis | 15/104.03 UX |
| 2,640,381 | 6/1953 | Manning | 81/414 |

FOREIGN PATENTS OR APPLICATIONS 181,250  6/1922  Great Britain ................... 7/1 E Primary Examiner—Harold D. Whitehead
Assistant Examiner—Roscoe V. Parker
Attorney—Harold D. Jones, Jr. et al.

[57] ABSTRACT

Pliers which include cutting surfaces on the convex, rounded outer portions of its jaws and in facing elongated concave grooves of its handles. The cutting surfaces of the jaws are file teeth in one embodiment of the invention and reaming blades or edges in the other embodiment of the invention. The jaws are adjustable with respect to each other to enlarge the space between the jaws and the distance between the file teeth or reaming edges of the jaws so that the jaws can be enlarged or reduced in size to fit into the open end of a pipe and rotated to cut away the rough end edges of the pipe. The file teeth of the handles are urged against the outer end surfaces of the open end of pipe to file away the rough edges of the pipe.

6 Claims, 5 Drawing Figures

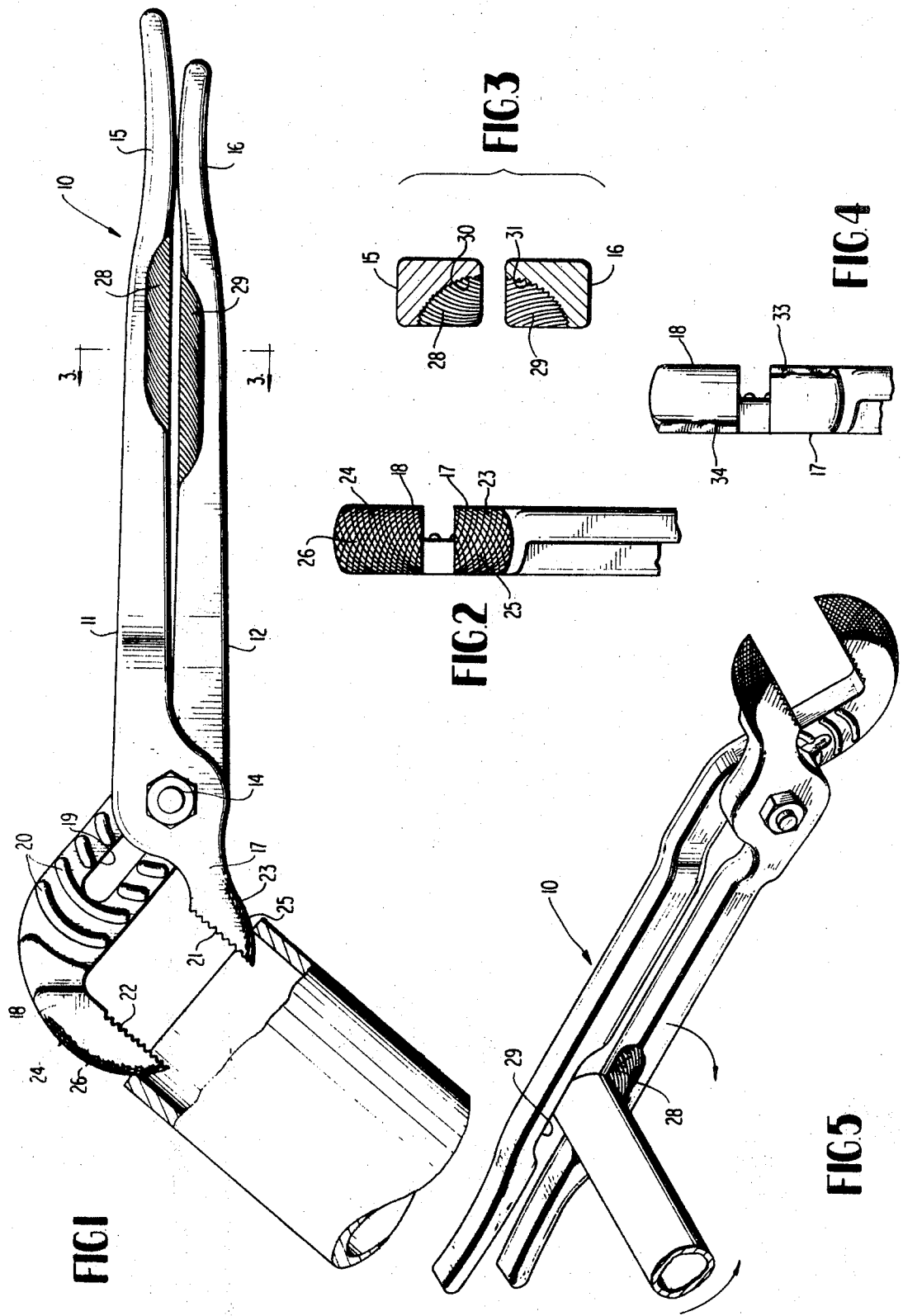

PLIERS WITH CUTTING SURFACES

BACKGROUND OF THE INVENTION

When the plumber or electrician installs conduits in a building structure, the conduits are usually cut to the proper length with a pipe cutter or saw or similar cutting tool at the job site. The ends of the conduits which have been freshly cut are usually somewhat jagged and rough, and the workman must ream or file the ends of the conduit to remove the jagged particles of metal. This reaming or filing function requires the workman to carry an additional tool with him to the job site, such as a reamer or file, or both. In addition, the workman must have available various other tools which are necessary for installing the conduits and for performing the many other associated functions of his craft, including pliers for gripping and twisting conduits, joints and other items.

SUMMARY OF THE INVENTION

Briefly described, the present invention comprises pliers with cutting surfaces which enable the craftsman to ream or file the ends of freshly cut conduit to remove the jagged particles of metal from the ends of the conduit. The pliers can be used in their conventional manner for gripping and twisting items, and the addition of the cutting surfaces to the pliers allows the workman to perform the reaming and filing functions without causing him to carry additional tools for these functions. The pliers include file teeth or reaming edges along the outer convex surfaces of its jaws, and file teeth in elongated facing grooves along the handles of the pliers. The file teeth or reaming edges of the jaws are usually inserted into the open end of a conduit and twisted with respect to the conduit to file or ream out the end of the conduit from its inside surface, while the file teeth of the elongated grooves of the handles are placed about the end of a conduit and rotated with respect to the conduit to file the end of the conduit from outside the conduit.

Thus, it is an object of the present invention to provide pliers which include means for filing or reaming the freshly cut ends of conduits so as to remove the rough end portions of the conduit.

Another object of this invention is to provide pliers with cutting surfaces which allow the plumber, electrician or similar workman to cut and install conduits, etc., without requiring the workman to carry additional files, reamers and other tools for removing the burrs or rough edges from the ends of the freshly cut conduits.

Other objects, features and advantages of the present invention will become apparent upon reading the following specification when taken in conjunction with the accompanying drawing.

BRIEF DESCRIPTION OF THE DRAWING

FIG. 1 is a side view of a pliers with cutting surfaces, showing the jaws of the pliers fitted into the cut end of a conduit.

FIG. 2 is a detailed illustration of the jaws of the pliers.

FIG. 3 is an end cross sectional view of the handles of the pliers, taken along lines 3—3 of FIG. 1.

FIG. 4 is a detailed illustration of the jaws of the pliers, similar to FIG. 2 but showing a modified form of the invention.

FIG. 5 is a perspective illustration of the pliers with cutting edges, showing the manner in which the file teeth of the handles are utilized to treat the end of a cut conduit.

DESCRIPTION OF THE PREFERRED EMBODIMENTS

Referring now in more detail to the drawing, in which like numerals indicate like parts throughout the several views, FIG. 1 shows a set or pair of pliers 10 which includes a pair of matched levers 11 and 12 pivotally connected together intermediate their ends by bolt 14. Levers 11 and 12 thus comprise handles 15 and 16 and jaws 17 and 18, respectively. Lever 12 includes an elongated slot 19 through which bolt 14 extends, and a plurality of crescent-shaped protrusions 20 which mate with a facing protrusion (not shown) of lever 11. The protrusion of lever 11 can be rotated out of registration with the protrusions 20 of lever 12, and bolt 14 can be moved along slot 19 to reposition the crescent-shaped protrusions with respect to each other. Thus, levers 11 and 12 can be moved with respect to each other along their lengths to adjust the jaws, to enlarge or reduce the space between the jaws.

Jaws 17 and 18 include inwardly facing gripping teeth 21 and 22 that are movable toward and away from each other as the jaws are pivoted about bolt 14, and thus function to grip bolt heads, nuts, or virtually any item of a size suitable for grasping by the jaws. The outer surfaces 23 and 24 of jaws 17 and 18 which are located on the surfaces opposite from gripping teeth 21 and 22 are curved along their lengths and are convex across their lengths. The outer surfaces 23 and 24 have imposed thereon file teeth 25 and 26 which function as cutting means. File teeth 25 and 26 of outer surfaces 23 and 24 cover a significant portion of the curved length of the jaws which extend outside of the gripping teeth 21 and 22.

Handles 15 and 16 include elongated grooves or recesses 28 and 29. Recesses 28 and 29 extend along the inner surfaces of handles 15 and 16 and are placed in approximate facing relationship with respect to each other. As is illustrated in FIG. 3, grooves 28 and 29 are approximately concave and include file teeth 30 and 31. When the handles are in the position illustrated, their file teeth 30 and 31 form with each other a portion of a helix configuration, with the file teeth 30 generally forming a continuation of the file teeth 31. The grooves 28 and 29 are long enough so that they will overlap each other regardless of the jaw adjustment of the pliers, even if bolt 14 of lever 11 is placed at one end or the other end of slot 19 of lever 12.

As is illustrated in FIG. 4, the file teeth 25 and 26 of jaws 17 and 18 can be replaced by cutting or reaming edges 33 and 34. Reaming edges 33 and 34 are positioned on opposite sides of jaws 17 and 18, so that when the plier jaws are inserted into the open end of a conduit in a manner illustrated in FIG. 1 and the pliers are rotated, the cutting edges 33 and 34 will tend to ream out or cut away the inner end portion of the conduit.

When the plumber or electrician has cut a conduit with his cutting tool or with a saw, etc., pliers 10 are adjusted by a sliding bolt 14 through slot 19 until the outer surfaces 23 and 24 of jaws 17 and 18 are spaced apart the proper distance so that the outer surfaces of the jaws will fit partially into the open end of the conduit. The workman urges the file teeth 25 and 26 of the outer surfaces of the jaws 23 and 24 into the opening of the conduit and twists the conduit about its longitudinal centerline with respect to the pliers. This rotational movement of the conduit with respect to the file teeth 25 and 26 causes the file teeth to cut away the jagged metal pieces remaining at the inner cut end of the conduit. The workman then places the grooves 28 and 29 of handles 15 and 16 about the outer cut end of the conduit (FIG. 5) and rotates the conduit about its longitudinal centerline with respect to the pliers. The movement of the conduit with respect to the file teeth 30 and 31 causes the rough portions about the open outer edge of the conduit to be cut away or removed. Thus, the tool functions to remove the burrs and other rough edges from both the inner and outer end surfaces of the cut conduit.

If the modified form of cutting means illustrated in FIG. 4 is used, the rotation of the pliers while having the reaming or cutting edges 33 and 34 inserted into the end opening of a conduit causes the rough inner edge of the conduit to be reamed out or cut away during one direction of relative rotation of the pliers with respect to the conduit. During the reversed direction of rotation, no cutting action will occur.

The placement of the grooves 28 and 29 and their file teeth 30 and 31 along the facing inner surfaces of handles 15 and 16 allows the pliers to be used in their conventional manner, in grasping nuts, bolt heads, etc., without interfering with the function of the pliers or impeding the grip of the workman. Also, the presence of the file teeth 25 and 26 on the outer surfaces 23 and 24 of jaws 17 and 18 of the pliers does not interfere with the normal use of the pliers. The adjustable feature of the pliers allows both the file teeth 25 and 26 of the jaws and the file teeth 30 and 31 of the handles to be adjusted with respect to each other to space the file teeth further away or closer together to accommodate conduits of various sizes. Moreover, when the file teeth 25 and 26 of jaws 17 and 18 are being used, the jaws can be spaced close together so that the file teeth cut further into the opening of the conduit, or spaced further apart so as to cut the conduit further out of its opening. The force of the cut made on the conduit can be controlled by the workman, by the workman varying the force with which he urges the jaws into the opening of the conduit, and by varying the force exerted by his hand in spreading the handles 15 and 16 apart to spread the jaws apart to bear against the inside surfaces of the conduit opening. Likewise, when the conduit end is urged into the elongated grooves 28 and 29 of handles 15 and 16, the force exerted on the conduit end by the file teeth 30 and 31 can be varied by the workman varying the force with which he urges the conduit into the cutting teeth, and also by varying the force with which he squeezes the handles together with his hand to grip the outer surface of the conduit. Since the grooves 28 and 29 of handles 15 and 16 are concave, the conduit end will tend to be received in the grooves and stay in the grooves during the filing of the conduit end.

While this invention has been described in detail with particular reference to preferred embodiments thereof, it will be understood that variations and modifications can be effected within the spirit and scope of the invention as described hereinbefore and as defined in the appended claims.

I claim:

1. Pliers comprising a pair of levers pivotally connected together intermediate their ends with handles on one side of said pivotal connection and jaws on the other side of said pivotal connection, the outer surfaces of said jaws being of generally rounded convex configuration and including cutting means imposed thereon whereby the outer surfaces of said jaws can be urged partially into the end opening of a conduit or the like and rotated with respect to the conduit to cut away the inner end portion of the conduit, and the inner side surfaces of a common side of said handles of said pliers each including elongated recesses extending along the lengths of said handles, said elongated recesses being of concave configuration across their lengths with file teeth formed in said recesses, whereby the end portion of a conduit or the like can be urged into the elongated recesses of the handles and rotated with respect to the handles to cut away the outer end portion of the conduit.

2. The pliers of claim 1 and wherein said pair of levers are movable with respect to each other along their lengths to enlarge or reduce the space between their jaws so that the distance between the cutting means on the outer surfaces of said jaws is increased or reduced a corresponding amount.

3. The pliers of claim 1 and wherein the file teeth in the recesses of said handles compliment each other to form a portion of an approximate helix configuration.

4. The pliers of claim 1 and wherein said cutting means imposed on the outer surfaces of said jaws comprises a reamer edge extending along the length of one jaw and oriented to cut the inner end portion of a conduit when the pliers are rotated in a first direction of rotation with respect to the conduit and a reamer edge extending along the length of the other jaw and oriented to cut the inner end portion of a conduit when the pliers are rotated in said first direction of rotation with respect to the conduit.

5. The pliers of claim 1 and wherein said elongated concave recesses of said handles are each of a length sufficient to overlap the other recess upon moving the handles with respect to each other along their lengths to enlarge or reduce the opening between said jaws.

6. The pliers of claim 1 and wherein said cutting means imposed on the outer surfaces of said jaws comprise file teeth extending along and about the convex surfaces of both jaws and arranged to cut the inner end portion of a conduit when the pliers are rotated in either direction of rotation with respect to the conduit.

* * * * *